July 12, 1932.　　　　S. W. FARNHAM　　　　1,867,141

CABLE REEL LOCOMOTIVE

Filed Nov. 5, 1930　　　2 Sheets-Sheet 1

Inventor
Sidney W. Farnham
Clarence F. Poole
Attorney

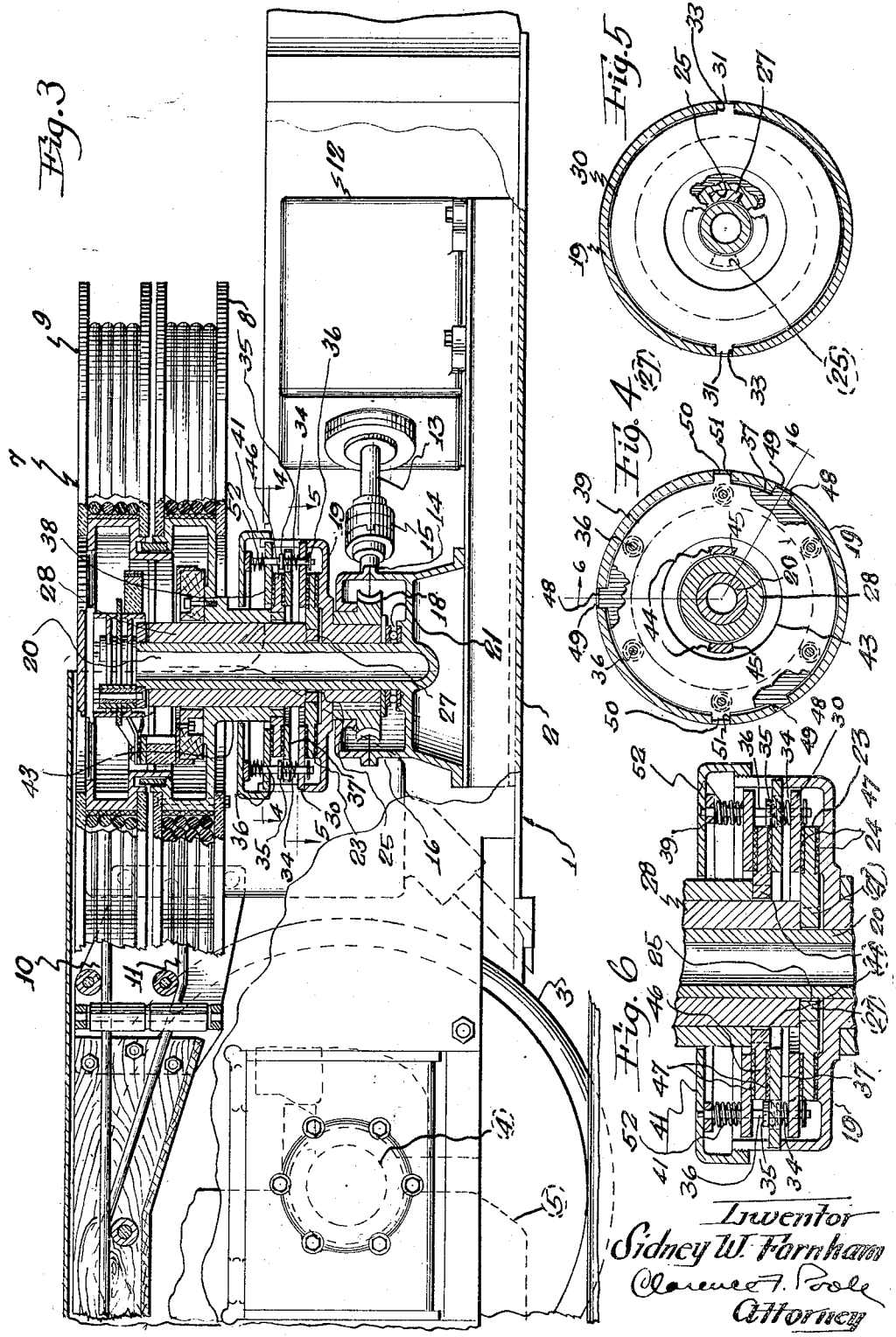

Patented July 12, 1932

1,867,141

UNITED STATES PATENT OFFICE

SIDNEY W. FARNHAM, OF CHICAGO, ILLINOIS, ASSIGNOR TO GOODMAN MANUFACTURING COMPANY, OF CHICAGO, ILLINOIS, A CORPORATION OF ILLINOIS

CABLE REEL LOCOMOTIVE

Application filed November 5, 1930. Serial No. 493,480.

This invention relates to improvements in cable reel locomotives of the type used in gaseous mines and has, among other objects, to provide a safe and economical means for conducting power to the locomotive when remote from the trolley line or other source of power and reduce to a minimum the possibility of explosion in the mine caused by arcing or burning of the cable due to failure of insulation of the cable or running over of the cable by the locomotive.

The present practice is to provide gathering locomotives with a double conductor flexible cable wound on a single cable reel. Due to the proximity of the two conductors to each other, insulation failure in one conductor is almost certain to cause a short circuit in the cable with the resultant arcing and burning of the cable. Also the resistance of such a cable when wound on a cable reel and a locomotive is under a heavy load causes heating of the cable and reel which softens the cable insulation and is liable to cause a failure of insulation and short circuit of the cable.

When a double conductor flexible cable has been run over by the locomotive and severed, the danger of short circuiting of the cable and burning of the entire cable is present. Since it is difficult to splice a severed double conductor cable and since the insulation at the point of the splice is weak, there is danger of insulation failure at this splice and such a failure when the cable is wound on the cable reel is certain to destroy and burn the entire cable reel.

At present there is no double conductor flexible cable or insulation known which will stand up under this short circuiting and arcing and not burn. Such burning of the cable is very dangerous and expensive in that it is liable to cause an explosion in a gaseous mine and will always cause a great loss whether the mine is gaseous or not since the cost of this cable is relatively high.

The device of my invention eliminates this danger and expense in that it provides a new and improved means for conducting power to a cable reel locomotive in a simplified manner which separately supports and allows for the winding in or paying off of positive and negative power conductors independently of each other.

In carrying out my invention two single conductor cables are provided for the locomotive instead of the usual double conductor cable and these are each wound on an insulated winding drum independently driven from a common source of power, which drums maintain a tension on the cables independently of each other.

My invention may be more clearly understood with reference to the accompanying drawings wherein:

Figure 3 is an enlarged partial fragmentary side elevation of the device shown in Figure 1 with parts broken away and in section to more clearly show the details of my invention;

Figure 4 is a sectional view taken on line 4—4 of Figure 3;

Figure 5 is sectional view taken on line 5—5 of Figure 3; and

Figure 6 is an enlarged sectional view taken on line 6—6 of Figure 4.

Like numerals refer to like parts throughout the various figures.

Figure 1:
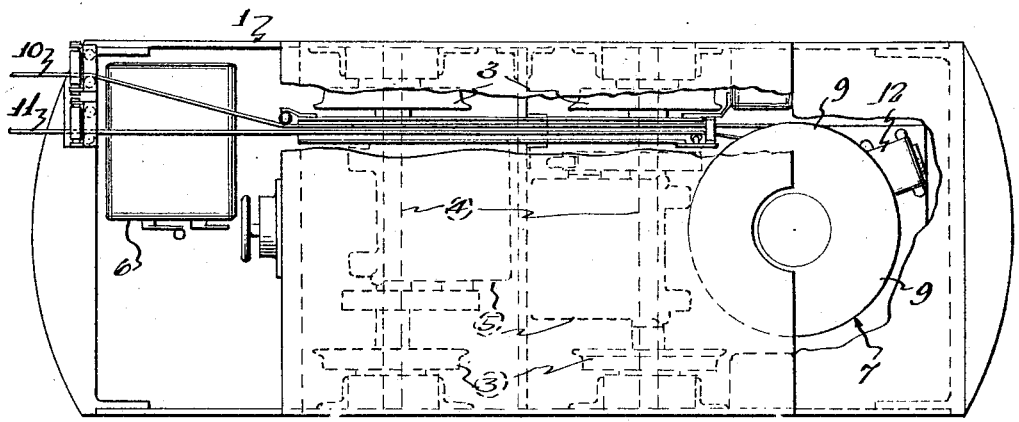
Figure 1 is a top plan view of the device embodying my invention with parts broken away.
Figure 2:
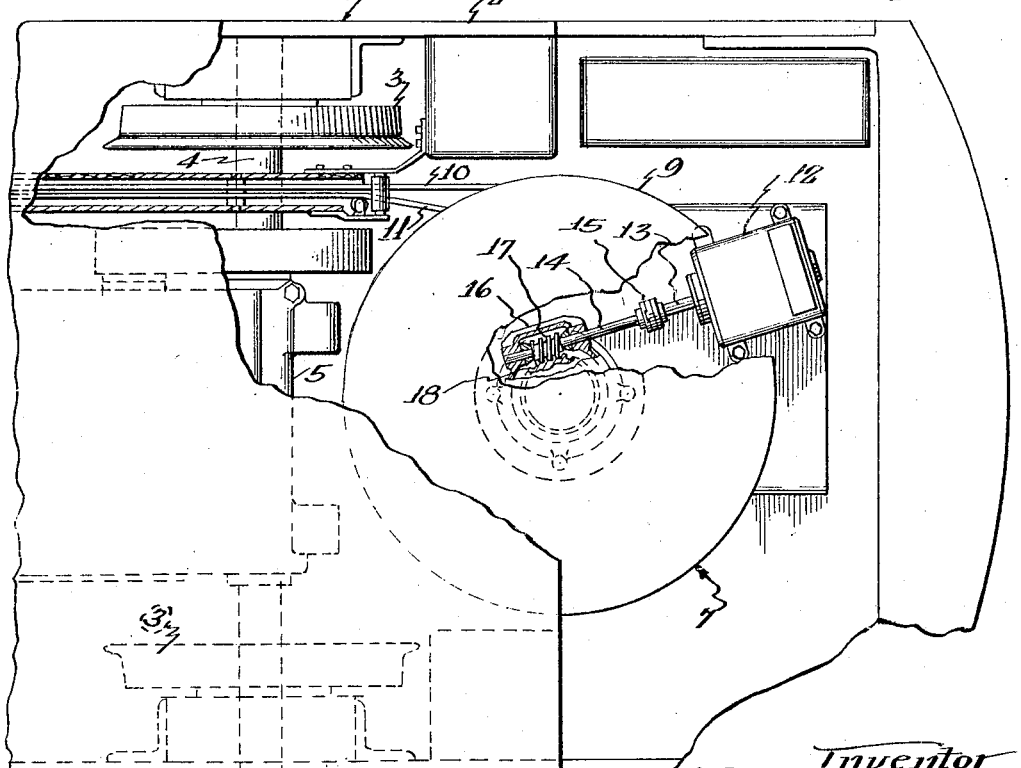
Figure 2 is an enlarged partial fragmentary plan view of the device shown in Figure 1 with parts broken away and in section to more clearly show the details of my invention.

Referring now in particular to the drawings, the device embodying my invention comprises a mine locomotive 1 including a frame 2 supported on wheels 3 and axles 4. The locomotive 1 is of a usual construction and is preferably provided with a pair of direct current electric motors 5 operatively connected to the axles 4 and wheels 3 to move the locomotive about the mine, which motors are controlled by a controller generally indicated at 6 in a usual manner.

Referring now in particular to the details of my invention, a cable reel, generally indicated at 7, is provided. This cable reel differs from the ordinary cable reel used on cable reel locomotives in that it comprises a plurality of winding drums, each drum of which is insulated from the other and is adapted to receive and independently wind on or pay off a single conductor cable and maintain a tension on said cables when being paid off and as herein shown comprises a lower winding drum 8 and an upper winding drum 9. These drums are both mounted so as to be rotatable about a common vertical axis but it may be understood that these drums may rotate about a horizontal axis as well as a vertical axis.

A single conductor cable 10 is provided. This cable is connectible with the main source of power supply at one of its ends and has its opposite end connectible with and adaptable to be wound on or payed off from the upper winding drum 9. A suitable means is provided to connect this cable through the drum 9 with the locomotive circuit to supply power to the locomotive motors 5, which means is of an ordinary construction and well known to the art so will not herein be described in detail.

Another cable 11 is connectible with an outside source of power and adaptable to be wound on or payed off from the lower winding drum 8 to supply power to the locomotive circuit in a usual manner.

When operating on the cable reel the locomotive circuit is disconnected from the mine rails so electric power is supplied to said locomotive through the cables 10 and 11 which are connected to, and wound on or payed off from the winding drums 9 and 8 respectively. This feature is fully described in my Reissue Patents No. 16,700 and No. 16,721 and eliminates the possibility of arcing between the locomotive wheels and the mine rails.

The winding drums 8 and 9 are differentially driven from a common source of power so as to compensate for additional load on one cable or the other and allow for fouling of one or the other of these cables to prevent breakage of either of said cables and are insulated from each other to eliminate the possibility of a short circuit between these drums in case one cable or the other should become grounded to the locomotive or one of the drums. Thus, since each cable or conductor is insulated and wound on a separate insulated winding drum independently of the other, the possibility of either cable short circuiting or grounding is reduced to a minimum and complete burning up of the cable due to a short circuit between the conductors on the reel is eliminated since there is no possibility of the cables grounding when wound on their separate reels and an insulation failure in one cable will not affect the other cable.

It should herein be noted that in case the locomotive does run over and sever one conductor or cable that this will not affect the other cable, and that such a severed cable may be more easily spliced than a double conductor cable, and that a failure of the splice in one cable will not affect the other cable.

Referring now to the details of the winding drums 8 and 9 and the means of driving these drums, an electric motor 12 is preferably provided for actuating said drums. The motor 12 is fastened to the locomotive frame 2 and has an armature shaft 13 operatively connected with a horizontal shaft 14 by means of a suitable coupling 15 in a usual manner. The horizontal shaft 14 is journaled in a worm and worm gear housing 16 and has a worm 17 fixed thereto. The worm 17 meshes with and drives a worm gear 18 keyed to the lower portion of a driving member 19. The driving member 19 is rotatable about a vertical member 20, which member provides a bearing support for the cable reel drums 8 and 9 and the entire cable reel mechanism.

The vertical member 20 is hollow and provides a means for receiving the electric conductors for conducting electric power from the winding drums 8 and 9 to the main line electric circuit.

The worm gear 18 and the driving member 19 are supported on a suitable thrust bearing indicated at 21, and the driving member 19 extends outwardly and upwardly from the worm gear 18 and forms a casing for friction drive mechanism for the winding drums 8 and 9.

A disk 23 (see Figs. 3 and 6) is supported on the inner top surface of the driving member 19 and is rotatable about the vertical support member 20. The disk 23 is provided with annular friction disks 24 on its top and bottom surfaces and the lower annular friction disk 24 engages the top surface of the driving member 19. Apertures 25 are provided adjacent the inner periphery of the disk 23 which are engaged by jaws 27 on the lower end of a hub 28 depending from and integral with the upper winding drum 9. The hub 28 is journaled on the vertical support member 20 for rotatable movement thereabout and is integral with and supports the entire upper winding drum 9 which, in turn, is supported on the disk 23. Thus the winding drum 9 forces the lower friction disk 24 to engage the driving member 19 so rotation of said driving member will cause rotation of the disk 23 and the cable reel drum 9.

A driving plate 30 is engageable with the top annular friction disk 24 and is provided with ears 31 which engage slots 33 in the driving member 19 so rotation of said driving member will cause rotation of the plate 30. Suitable compression means are provided to engage the plate 30 with the annular friction disk 24, which means herein comprise a plurality of compression springs 34 interposed between the top portion of the driving plate 30 and stops 35 on rods 36 which pass through the driving plate 30 near their lower end and extend upwardly and pass through plates 37 and 38. The upper ends of the rods 36 pass through an annular ring 39 and are engaged by the under portion of a cover 41 for the driving member 19. The cover 41 engages the annular ring 39 and rods 36 and is threaded on the driving member 19 to provide a means for adjusting the pressure of the compression springs 34 on the plate 30.

The winding drum 8 is similarly provided with an integral hub 43 which is journaled on the outer periphery of the hub 28 for rotatable movement thereabout. The hub 43 is provided with depending jaws 44 at its lower end, which jaws engage apertures 45 in a disk 46 for supporting said hub and the winding drum 8 on said disk and driving said drum therefrom. The disk 46 is provided with annular friction disks 47 on its upper and lower surfaces and is supported on and engages the driving plate 37 supported on the driving member 19. The driving plate 37 is provided with a plurality of ears 48 which engage notches 49 in the driving member 19 and is supported on said driving member by engagement of said ears with said notches. The driving plate 38 is similar to the plate 30 and is provided with a plurality of ears 50 which are engaged in notches 51 in the driving member 19 and the under portion of said driving plate engages the top annular friction disk 47.

Compression springs 52 are mounted on the rods 36 near the top end thereof and are interposed between the annular ring 39 and driving plate 38 to engage said driving plate with the friction disk 47 and rotate said friction disk and the disk 46 upon rotation of said driving plate. Pressure of the driving plate 38 on the friction disk 47 is regulated by the cover 41 as has hereinbefore been described in connection with the plate 30 and disk 23.

It may thus be seen that the winding drum 9 is supported on the disk 23 which, in turn, is supported on the driving member 19 and that an annular friction disk is interposed between the disk 23 and said driving member. It may also be seen that the winding drum 8 is supported on the disk 46 which, in turn, is supported on the driving plate 37, which driving plate is supported on the driving member 19, and that the friction disk 47 is interposed between the disk 46 and said driving plate. Thus the weight of each winding drum determines the driving force for driving said cable reel from the driving member 19 and as the cables 10 and 11 are wound on their respective winding drums or reels this driving force is increased.

It may now be seen that a frictionally controlled means has been provided for driving the cable reel drums 8 and 9 independently or simultaneously of each other so one of these drums will be stopped upon fouling of its cable due to slippage between the friction disks and driving members, thus preventing breakage of the cable upon such fouling and providing a means for maintaining tension on each cable independent of the other cable. Thus when the locomotive is moving towards its source of power supply the cables 10 and 11 are wound on their respective winding drums, the slippage of the friction disks 24 on the driving member 19 and friction disk 47 in the driving plate 37 provides a differential drive for each winding drum and provides meanes for compensating for the difference in tension between the two cables so both of said cables may be maintained at an even tension with respect to each other. This provides a safe and effective means for transmitting the electric power to a mine locomotive in that each cable is insulated from the other and wound on a separate drum and each cable winding drum is insulated from the other, and in that the entire locomotive circuit is insulated from the mine rails so a break or short circuit or failure of insulation in one cable will not affect the other cable and thus will not cause arcing, sparking or burning up of the cables or winding drums.

While I have shown herein and described one embodiment of my invention it will be understood that the arrangement and construction of the parts may be altered without departing from the spirit and scope thereof. Furthermore, I do not wish to be construed as limiting myself to the precise details of construction or arrangements of parts herein shown and described except as specifically limited in the appended claims.

I claim as my invention:

1. In combination with a cable reel locomotive, means for supplying power to said locomotive comprising a plurality of single conductor cables insulated from each other and having connection with an outside source of power, winding means for supporting said cables on said locomotive comprising a separate winding drum for winding in or paying off each cable, said winding drums being insulated from each other and rotatable about a common vertical axis, and means for independently or simultaneously driving said winding drums comprising a motor, a driving member, a disk engaging one of said drums for supporting said drum and rotating said drum therewith, a friction disk interposed between said first mentioned disk and said driving member, a driving plate supported by said driving member and rotated thereby, a disk engaging said other drum for supporting said drum and rotating said other drum, and a friction disk interposed between said second mentioned disk and said driving plate.

2. In combination with a cable reel locomotive, means for supplying power to said locomotive comprising a plurality of single conductor cables insulated from each other and having connection with an outside source of power, winding means for supporting said cables on said locomotive comprising a separate winding drum for winding in or paying off each cable, said winding drums being insulated from each other and rotatable about a common vertical axis, and means for independently or simultaneously driving said winding drums comprising a motor, a driving member, a disk engaged by the hub of one of said drums for supporting said drum and rotating said drum therewith, a friction disk interposed between said first mentioned disk and said driving member, a driving plate supported by said driving member and rotated thereby, a disk engaged by the hub of said other drum for supporting and rotating said other drum, and a friction disk interposed between said second mentioned disk and said driving plate.

3. In combination with a cable reel locomotive, means for supplying power to said locomotive comprising a plurality of single conductor cables insulated from each other and having connection with an outside source of power, winding means for supporting said cables on said locomotive comprising a separate winding drum for winding in or paying off each cable, said winding drums being insulated from each other and rotatable about a common vertical axis, and means for independently or simultaneously driving said winding drums comprising a motor, a driving member, a disk engaged by the hub of one of said drums for supporting said drum and rotating said drum therewith, a friction disk interposed between said first mentioned disk and said driving member, a driving plate above said disk and rotated by said driving member, a friction disk interposed between said plate and said disk, means for engaging said plate with said friction disk, a driving plate supported by said driving member above said last mentioned plate and driven by said driving member, a disk engaged by the hub of said other drum for supporting and rotating said other drum, a friction disk interposed between said disk and said driving plate, a driving plate above said disk and rotated by said driving member, a friction disk interposed between said last mentioned driving plate and said disk, and means for engaging said last mentioned driving plate with said friction disk.

4. In combination with a cable reel locomotive, means for supplying power to said locomotive comprising a plurality of single conductor cables insulated from each other and having connection with an outside source of power, winding means for supporting said cables on said locomotive comprising a separate winding drum for winding in or paying off each cable, said winding drums being insulated from each other and rotatable about a common vertical axis, and means for independently or simultaneously driving said winding drums comprising a motor, a driving member, a disk engaged by the hub of one of said drums for supporting said drum and rotating said drum therewith, a friction disk interposed between said first mentioned disk and said driving member, a driving plate above said disk and rotated by said driving member, a friction disk interposed between said plate and said disk, means for engaging said plate with said friction disk comprising a plurality of compression spring members, a driving plate supported by said driving member above said last mentioned plate and driven by said driving member, a disk engaged by the hub of said other drum for supporting and rotating said other drum, a friction disk interposed between said disk and said driving plate, a driving plate above said disk and rotated by said driving member, a friction disk interposed between said last mentioned driving plate and said disk, and means for engaging said last mentioned driving plate with said friction disk comprising a plurality of compression spring members.

5. In combination with a cable reel locomotive, means for supplying power to said locomotive comprising a plurality of single conductor cables insulated from each other and having connection with an outside source of power, winding means for supporting said cables on said locomotive comprising a separate winding drum for winding in or paying off each cable, said winding drums being insulated from each other and rotatable about a common vertical axis, and means for independently or simultaneously driving said winding drums comprising a motor, a driving member, a disk, friction means interposed between said disk and said driving member and having bearing engagement with said driving member, a hub depending from one of said drums engageable with and supported by said disk, the weight of said drum engaging said friction means with said disk and driving member, a driving plate supported by said driving member and rotated thereby, a second disk, friction means interposed between said second disk and said driving plate, a hub depending from said other drum journaled on said first mentioned hub and engageable with and supported by said second disk, the weight of said drum engaging said friction means with said disk and driving member, and means for operatively connecting said motor with said driving member.

6. In combination with a cable reel locomotive, means for supplying power to said locomotive comprising a pair of winding drums, each of said drums having a cable connected thereto and adapted to be wound thereon and rotatable about a common vertical axis, a driving member, a hub depending from one of said drums and having supporting engagement with said driving member, and a hub depending from said other drum having bearing engagement with said hub of said first mentioned drum and having supporting engagement with said driving member above the point of engagement of said first mentioned hub with said driving member.

7. In combination with a cable reel locomotive, means for supplying power to said locomotive comprising a pair of winding drums, each of said drums having a cable connected thereto and adapted to be wound thereon and rotatable about a common vertical axis, a motor, and means for simultaneously or independently driving said winding drums from said motor comprising a driving member driven by said motor, a friction device supported on said driving member, a hub depending from one of said drums and adapted to bear on and be supported by said friction device, another friction device supported on said driving member above said first mentioned friction device and a hub depending from said other drum having bearing engagement with said hub of said first mentioned drum and adapted to bear on and be supported by said second mentioned friction device.

8. In combination with a cable reel locomotive, means for supplying power to said locomotive comprising a pair of winding drums rotatable about a common vertical axis, each of said drums having a cable connected thereto and adapted to be wound thereon, and means for driving said winding drums whereby the driving torque of each of said winding drums varies with the amount of cable thereon comprising a separate driving member supporting each of said winding drums and having frictional driving engagement therewith, said driving members being arranged one above the other.

9. In combination with a cable reel locomotive, means for supplying power to said locomotive comprising a pair of winding drums rotatable about a common vertical axis, each of said drums having a cable connected thereto and adapted to be wound thereon, and means for independently or simultaneously driving said drums from a common source of power whereby the driving torque of each of said winding drums varies with the amount of cable thereon, comprising a driving member supporting one of said drums and having frictional driving engagement therewith, and another driving member supporting said other drum arranged beneath said first mentioned driving member and having frictional driving engagement with said other drum.

Signed at Chicago, in the county of Cook and State of Illinois, this 3rd day of November, 1930.

SIDNEY W. FARNHAM.